US010769713B1

(12) United States Patent
Townsend

(10) Patent No.: US 10,769,713 B1
(45) Date of Patent: Sep. 8, 2020

(54) ELECTRONIC SHOPPING CART

(71) Applicant: Eleana Townsend, Aventura, FL (US)

(72) Inventor: Eleana Townsend, Aventura, FL (US)

( * ) Notice: Subject to any disclaimer, the term of this patent is extended or adjusted under 35 U.S.C. 154(b) by 98 days.

(21) Appl. No.: 16/170,621

(22) Filed: Oct. 25, 2018

(51) Int. Cl.
*G06Q 30/00* (2012.01)
*G06Q 30/06* (2012.01)
*G01G 19/52* (2006.01)
*G06K 7/14* (2006.01)

(52) U.S. Cl.
CPC ......... *G06Q 30/0635* (2013.01); *G01G 19/52* (2013.01); *G06K 7/1413* (2013.01)

(58) Field of Classification Search
CPC .................................................... G06Q 30/00
See application file for complete search history.

(56) References Cited

U.S. PATENT DOCUMENTS

| | | | |
|---|---|---|---|
| 4,071,740 A | 1/1978 | Gogulski | |
| 7,648,068 B2 | 1/2010 | Silverbrook et al. | |
| 7,934,647 B1 * | 5/2011 | Mims | B62B 5/0096 235/383 |
| 9,230,249 B1 * | 1/2016 | Vora | G06Q 20/202 |
| 2007/0125848 A1 * | 6/2007 | Bannetto Piamenta | B62B 3/1428 235/383 |
| 2009/0106085 A1 * | 4/2009 | Raimbeault | G06Q 20/208 705/14.44 |
| 2011/0036907 A1 * | 2/2011 | Connelly | B62B 3/148 235/383 |
| 2012/0284132 A1 * | 11/2012 | Kim | G07G 1/0081 705/20 |
| 2013/0080719 A1 * | 3/2013 | Connelly | B62B 3/148 711/154 |
| 2014/0214596 A1 * | 7/2014 | Acker, Jr. | G06Q 30/0633 705/26.8 |
| 2016/0110797 A1 * | 4/2016 | Brosnan | G06K 9/00536 705/26.8 |
| 2016/0110799 A1 * | 4/2016 | Herring | G06Q 30/016 705/26.81 |
| 2016/0300455 A1 * | 10/2016 | Hutchings | G07G 1/009 |
| 2017/0169440 A1 * | 6/2017 | Dey | G06Q 30/0201 |
| 2018/0218351 A1 * | 8/2018 | Chaubard | G07G 1/0072 |

(Continued)

OTHER PUBLICATIONS

Abhilash, C.b., An IOT Based Smart Shopping Cart for Smart Shopping, researchgate .net, dated Apr. 2018. (Year: 2018).*

*Primary Examiner* — Mark A Fadok
(74) *Attorney, Agent, or Firm* — Sanchelima & Associates, P.A.; Christian Sanchelima; Jesus Sanchelima

(57) ABSTRACT

The present invention discloses an electronic shopping cart comprising sensor unit, processing unit and display unit. The sensor unit comprises various sensors placed at each corner of the cart and sensory net placed at base of the cart. At least one sensory line connects sensors and sensory net. The sensors generate sensor data by detecting item placed into or taken away from cart. The sensory net detects change in weight of cart and generate sensory net data. The processing unit processes sensor data and sensory net data and accordingly retrieves information of item from at least one item database. Based on retrieved information, processing unit calculates subtotal of item and grand total cost of all items in cart and are displayed to user on display screen long with item details. Sensors, sensory net and sensory line together identifies item added into cart or removed from cart, and maintain integrity of items in basket.

16 Claims, 4 Drawing Sheets

(56) References Cited

U.S. PATENT DOCUMENTS

| | | | |
|---|---|---|---|
| 2019/0005482 A1* | 1/2019 | Madden | G06Q 20/202 |
| 2019/0102611 A1* | 4/2019 | Herring | G06Q 30/0201 |
| 2019/0279185 A1* | 9/2019 | Cheng | B62B 3/1424 |
| 2019/0297139 A1* | 9/2019 | Bernath | H04L 67/1002 |

* cited by examiner

| Shopping Cart ||||| 
|---|---|---|---|---|
| S. No. 402 | Item 403 | Quantity 404 | Price ($) 405 | Sub Total ($) 406 |
| 1. | Shampoo | 2 | 5 | 10 |
| 2. | Water Bottel | 5 | 4 | 20 |
| 3. | Face Wash | 3 | 7 | 21 |
| 4. | Teddy Bear | 1 | 10 | 10 |
| 5. | Lunch Box | 4 | 10 | 40 |
| Grand Total |||| 101 USD |

FIG. 4

ELECTRONIC SHOPPING CART

BACKGROUND OF THE INVENTION

1. Field of the Invention

The present disclosure relates to an electronic shopping cart. More particularly, the present disclosure relates to an electronic shopping cart that scans each item placed into cart or item taken from cart and accordingly displays running total price of all items, at the time of shopping.

2. Description of the Related Art

While shopping, user is not aware of what items they have taken so far and what would be the total cost of items taken so far. It is essential to display items are taken and total cost of items taken so far, so that user can plan and accordingly add or reject items placed into the cart based on budget or shopping limit of each individual.

Applicant believes that a related reference corresponds to U.S. Pat. No. 7,648,068B2 patent application number filed by Silverbrook Research Pty Ltd for a shopping cart system with automatic shopping item total calculator. The reference discloses a shopping cart system includes a shopping cart. The shopping cart includes a receptacle to hold shopping items bearing coded data tags. A scanning device is mounted to the shopping receptacle and is configured to scan the data tags of the shopping items to thereby determine the identity of the shopping items. A computer system is configured to calculate the total cost of the scanned shopping items using the determined identity of the shopping items.

Another related application is US U.S. Pat. No. 4,071,740A filed by Paul Gogulski for a mobile automated shopping system. The reference discloses an improved automated shopping system used within stores. It is of the type utilizing shopping carts having product code scanning means and product weight sensing means located thereon in conjunction with a central computer which is also located within the store, wherein the improvement comprises a first scanner releasably mounted on the shopping cart, a control panel mounted upon the shopping cart, means for visual display of word and numerical entries on the control panel, means for the readings of the first scanner to appear on the visual display, means for totaling numerical data that appear on the visual display, a second scanner located on the control panel, means whereby the second scanner's numerical entries are totaled and the total, with the second scanner's other readings appear on the visual display, and a printout device located in said control panel which records and totals the numerical entries and prints them on tape.

Other documents describing the closest subject matter provide for a number of more or less complicated features that fail to solve the problem in an efficient and economical way. None of these patents suggest the novel features of the present invention.

SUMMARY OF THE INVENTION

It is an object of the present invention to provide an electronic shopping cart. More particularly, the present disclosure relates to an electronic shopping cart that scans each item placed into cart or item taken from cart and accordingly displays running price total of all items, at the time of shopping.

It is still another object of the present invention to provide an electronic shopping cart that comprises sensor unit, processing unit and display unit. The sensor unit comprises array of sensors placed at each corner of the cart and sensory net placed at base of the cart. At least one sensory line connects sensors and sensory net. The sensors generate sensor data by detecting item placed into or taken away from cart. The sensory net detects change in weight of cart and generate sensory net data. The processing unit processes sensor data and sensory net data and accordingly retrieves information of item from at least one item database. Based on retrieved information, processing unit calculates subtotal of item and grand total cost of all items in cart and are displayed to user on display screen long with item details. Sensors, sensory net and sensory line together identifies item added into cart or removed from cart, and maintain integrity of items in cart.

It is another object of the present invention to provide an electronic shopping cart that comprises a sensory net. The sensory net can act as a weight scale to detect change in weight of cart and to identify whether any item is placed inside the cart or taken away.

It is another object of the present invention to provide an electronic shopping cart that comprises at least one electronic line that connects all sensors and sensory net to maintain integrity of items placed in or taken away from cart.

It is another object of the present invention to provide an electronic shopping cart that display grand total of all items allows users to plan and purchase items based on their budget or based on cash in hand or amount in electronic credit or debit card. This can save money and limit user to purchase items according to affordable cost of purchase.

Further objects of the invention will be brought out in the following part of the specification, wherein detailed description is for the purpose of fully disclosing the invention without placing any limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which:

FIG. 4 shows display screen 111 of FIG. 3 showing shopping cart details 401 such as serial number 402, item name 403, quantity 404, cost 405 of each item, subtotal 406 of an item and total amount 408 of all items in cart 100.

DETAILED DESCRIPTION OF THE EMBODIMENTS OF THE INVENTION

Figure 1:
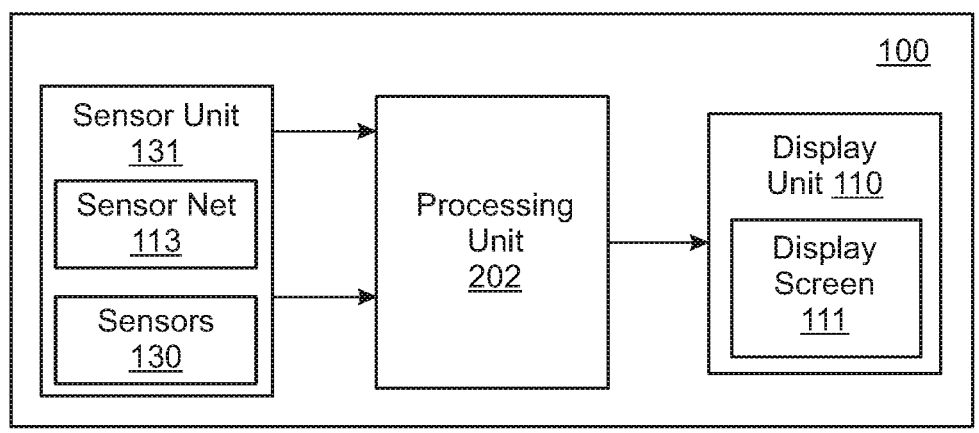
FIG. 1 demonstrates block diagram of an electronic shopping cart 100 of present invention. The cart 100 has sensor unit 131, processing unit 202 and display unit 110, to detect item in cart 100 and display item name, quantity, cost of each item and total amount of all items in cart on display screen 111.

FIG. 1 demonstrates block diagram of an electronic shopping cart 100 of present invention. Cart 100 comprising sensor unit 131, processing unit 202, display unit 110 and battery unit (not shown) which powers the different units in the cart 100. The sensor unit 131 comprises various sensors 130 placed at each corner of the cart 100 and sensory net 113 placed at base of the cart 100. At least one sensory line connects sensors 130 and sensory net 113. The sensors 130 generate sensor data by detecting item placed into or taken away from cart 100. The sensory net 113 detects change in weight of cart 100 and generate sensory net data. The processing unit 202 processes sensor data and sensory net data and accordingly retrieves information of item from at least one item database (not shown). The database can have item details such as item name, item cost, expiry data, manufacturing date, and so on. The processing unit 202 retrieved information item details from item database and calculated subtotal of each item and grand total cost of all items in cart. The item details and subtotal and grand total are displayed to user on display screen 111 of display unit 110. Sensors 130, sensory net 113 and sensory line together identifies item added into cart or removed from cart, and maintain integrity of items in basket. The processing unit 202 can connect to display unit 110, sensor unit 131 or item database, through proper wired or wireless I/O interface. The display unit 202 can be not limited to a Liquid Cristal Display (LCD) or Light Emitting Diode (LED) unit.

Figure 2:
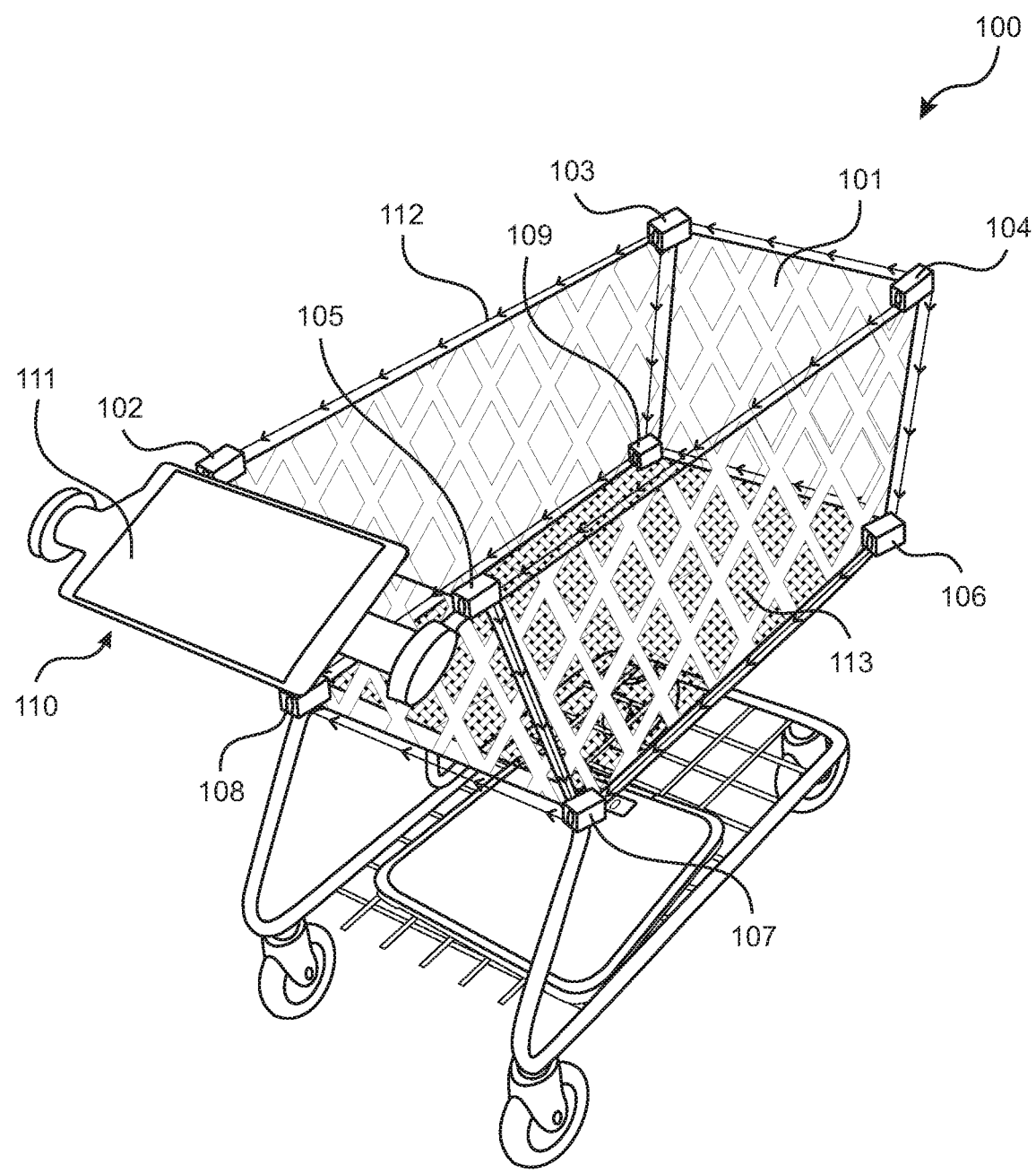
FIG. 2 demonstrates perspective view of electronic shopping cart 100 showing sensors 102-109 installed at corner of basket 101 and sensory net 113 installed at base of basket 101. Electronic line 112 connects sensors 102-109 to sensory net 113. Display unit 110 displays details of items to be purchased on display screen 111.
Figure 3:
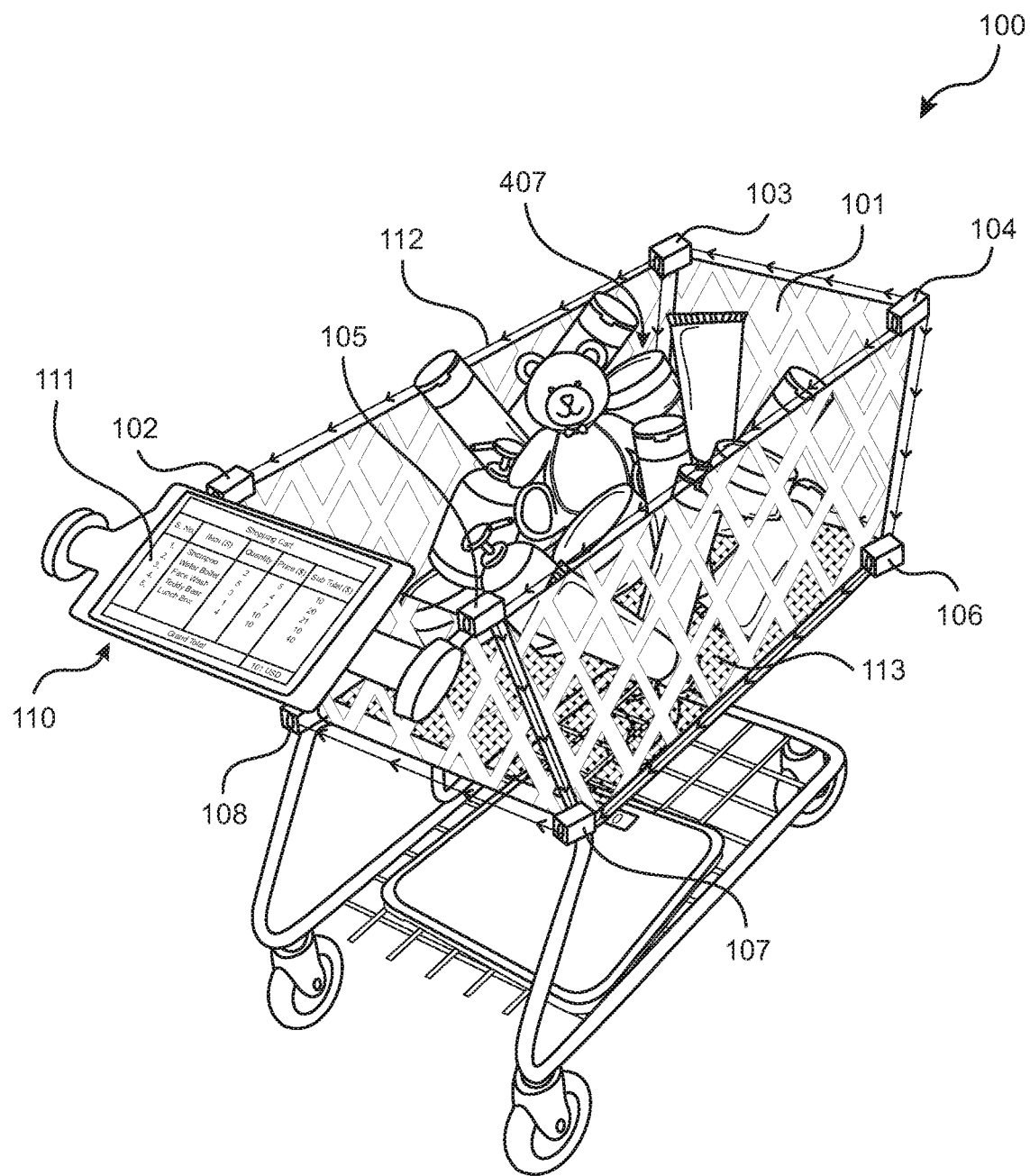
FIG. 3 demonstrates perspective view of electronic shopping cart 100 of FIG. 2 having basket 101 with items to be purchased. Based on data from sensor 102-109 and sensory net 113, item name, quantity, cost of each item and total amount of all items in cart 100 are displayed on display screen 111 of display unit 110.

FIG. 2 shows perspective view of electronic shopping cart 100 of FIG. 1. As shown in FIG. 2, sensors 102-109 also referred all together as sensors 130 in FIG. 1. The sensors 102-109 are installed at corners of basket 101 and sensory net 113 is installed at base of basket 101. Top sensors 102-105 are installed at top corners of basket 101 and bottom sensors 106-109 are installed at bottom corners of basket 101. Electronic line 112 connects sensors 102-109 to sensory net 113. This maintains integrity of items placed in cart. For example, the placing new item or taking item from cart are easily accounted in real time using active electronic line 112 of sensors 102-109 and sensory net 113. Display unit 110 displays details of items in cart, on display screen 111. Details of items comprises item name, quantity, cost of each item, subtotal of item and grand total amount of all items in cart 100. FIG. 3, shows with various items 307 placed into electronic shopping cart 100. Various items 307 can be items or products in departmental or grocery store and the like, without limitation. It should be noted that all items should labels/code/bar code that are detectable by sensors.

FIG. 4 shows display screen 111 of FIG. 3 showing shopping cart details 401 such as serial number 402, item name 403, quantity 404, price/cost 405 of each item, subtotal 406 of an item and grand total amount 408 of all items in cart 100. As soon when items are placed into cart 100, the sensors 102-109 and sensory net 113 detects item placed into cart 100, processing unit 202 processes sensor and sensory net data, retrieves item details from item database, calculates cost information and send item details to display screen 111.

Referring to FIG. 1-4, sensor 102-109 are not limited to sensors that can detect objects that are placed in or taken away from cart. One example of such sensor can be sensor with bar code reader that can read bar code of each item placed inside cart or taken away from cart. If an item is placed inside the cart, bar code reader in sensor can read bar code on the item and generate sensor data. The sensory net 113 and electronic line 112 helps to keep track of items placed in or taken away from cart 100 and accordingly generate sensory net data. The processing unit 202 can retrieve item details from item database based on sensor data and sensory net data and display item details on display screen 111. Processing unit 202 calculates subtotal of each item and grand total of all items in cart and display it on the display screen 111. This maintains integrity of items in cart 100. The sensory net 113 can act as a weight scale to detect change in weight of cart 100 and to identify whether any item is placed inside the cart 100 or taken away. The sensor 102-109 can also detect item taken away and accordingly detect item list on display screen 111. The subtotal 306 and grand total 308 are displayed in real time and are updated based on change in item number in cart 100. Displaying grand total 308 of all items allows users to plan and purchase items based on their budget or based on cash in hand or amount in electronic credit or debit card. This can save money and limit user to purchase items according to affordable cost of purchase.

Other modifications of the invention can be that user can set budget at the time of starting shopping or at the time of taking empty shopping cart for purchase. When total purchase exceeds set budget, the shopping cart can alert the user with buzzer or alarm. Also an alert sound shall be generated when user of cart shops same item more than once unknowingly. The present invention is not limited to setting user name and password at display unit using at least one unique identity, such as username or electronic mail or mobile number to login into electronic shopping cart. The user can set budget for each future purchase, add or link payment methods within the present system. The other types of login to present invention are not limited to use of general shopping card or shopping card exclusive to each shop or group of shops or finger print login.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:
1. An electronic shopping cart, comprising:
at least one cart with a basket to carry shopping items therein;
at least one sensor unit including at least one top sensor, at least one bottom sensor and at least one sensory net, said at least one sensory net detecting a weight of said items, said at least one sensor unit detecting items placed or taken from cart;
at least one electronic line to connect said at least one top sensor, said at least one bottom sensor and said at least one sensory net, at least one electronic line being in constant abutting contact with said at least one top sensor, said at least one bottom sensor and at least one sensory net simultaneously, said at least one electronic line extending horizontally entirely along a top perimeter and a bottom perimeter of said basket, said at least one electronic line further extending vertically along corners of said basket between said top perimeter and said bottom perimeter;
at least one processing unit to process data from said at least one sensor unit, said at least one sensor unit generating item details; and
at least one display unit to display said item details.

2. The electronic shopping cart of claim 1, wherein said at least one top sensor is installed at top corners of said basket.

3. The electronic shopping cart of claim 1, wherein said at least one bottom sensor is installed at bottom corners of basket.

4. The electronic shopping cart of claim 1, wherein said at least one top and said at least one bottom sensor detect said items placed into or removed from said cart, said at least one top sensor and said at least one bottom sensor generate sensor data.

5. The electronic shopping cart of claim 4, wherein said at least one sensory net detects a weight change within said basket and generates sensory net data.

6. The electronic shopping cart of claim 1, wherein said at least one sensory net is installed at a base of said basket.

7. The electronic shopping cart of claim 1, wherein said at least one sensor unit scans at least one data on said items to detect said items placed or removed from said basket.

8. The electronic shopping cart of claim 4, wherein a processing unit identifies item details by retrieving said sensor data from a database.

9. The electronic shopping cart of claim 5, wherein said processing unit based on sensory net data and sensor data, add or detect item details on display screen.

10. The electronic shopping cart of claim 8, wherein said item details include an item name and an item cost.

11. The electronic shopping cart of claim 1, wherein said at least one sensor unit includes at least one bar code reader.

12. The electronic shopping cart of claim 8, wherein said processing unit calculates a subtotal of each of said items and a grand total cost of all of said items within basket based on said item details.

13. The electronic shopping cart of claim 12, wherein said at least one display unit displays said subtotal and said grand total cost.

14. The electronic shopping cart of claim 1, wherein said at least one top sensor, said at least one bottom sensor, said at least one sensory net and at least one electronic line together identify said items added or removed from said at least one cart and maintain the integrity of said items within said basket.

15. The electronic shopping cart of claim 1, wherein said at least one top sensor is entirely above of said basket, said at least one bottom sensor is adjacent to laterals sides of said basket.

16. The electronic shopping cart of claim 1, wherein said basket includes perforated sidewalls, said at least one bottom sensor aims within said basket through said perforated sidewalls.

* * * * *